United States Patent

Navid et al.

[11] Patent Number: 5,995,541
[45] Date of Patent: Nov. 30, 1999

[54] METHOD AND APPARATUS FOR SELF-CALIBRATION AND TESTING OF ZPSK TRANSMITTER/RECEIVER IC'S

[75] Inventors: Nasrollah Saeed Navid, Sunnyvale; Farbod Behbahani, Inglewood; Ali Fotowat-Ahmady, San Rafael, all of Calif.

[73] Assignee: Philips Electronics North America Corporation, New York, N.Y.

[21] Appl. No.: 08/543,245

[22] Filed: Oct. 13, 1995

[51] Int. Cl.[6] .............................. H04B 3/46; H04B 17/00
[52] U.S. Cl. ..................... 375/224; 371/20.5; 371/285; 379/6
[58] Field of Search .......................... 375/224, 227, 375/219, 213, 279, 281, 284, 285, 308, 329, 330; 371/5.1, 20.5, 30, 47.1, 48; 370/241, 249; 379/5, 6, 22, 27, 28, 29; 455/226.1

[56] References Cited

U.S. PATENT DOCUMENTS

| | | | |
|---|---|---|---|
| 4,717,894 | 1/1988 | Edwards et al. | 455/115 |
| 4,825,459 | 4/1989 | Farrow et al. | 379/3 |
| 5,012,208 | 4/1991 | Makinen et al. | 455/126 |
| 5,077,782 | 12/1991 | Bushue et al. | 375/213 |
| 5,115,451 | 5/1992 | Furlong | 375/221 |
| 5,119,399 | 6/1992 | Santos et al. | 375/224 |
| 5,244,149 | 9/1993 | Garcia | 375/221 |
| 5,309,429 | 5/1994 | Fukuda | 370/224 |
| 5,319,804 | 6/1994 | Matsumoto et al. | 455/126 |
| 5,381,108 | 1/1995 | Whitmarsh et al. | 455/126 |
| 5,451,839 | 9/1995 | Rappaport et al. | 375/224 |
| 5,507,015 | 4/1996 | Karczewski et al. | 455/116 |

FOREIGN PATENT DOCUMENTS

| | | |
|---|---|---|
| 0473373A2 | 3/1992 | European Pat. Off. . |
| 0608577A1 | 1/1993 | European Pat. Off. . |
| 0572130A1 | 5/1993 | European Pat. Off. . |
| 0617532A1 | 3/1994 | European Pat. Off. . |
| 4354441A | 12/1992 | Japan . |
| WO9523458 | 8/1995 | WIPO . |

OTHER PUBLICATIONS

"Automatic Adjustment of Quadrature Modulators", Electronics Letters, Jan. 31, 1991, vol. 27, No. 3 pp. 214–216.

*Primary Examiner*—Chi H. Pham
*Assistant Examiner*—Bryan Webster
*Attorney, Agent, or Firm*—Brian J. Weighaus

[57] ABSTRACT

A method and a circuit for self-calibration and testing QPSK transmitter/receiver IC's is provided. The method and circuit enable variable error parameters such as gain mismatch, offset voltages, and phase errors inherent in the circuit and signals to be measured and taken into account by the digital signal processors for minimum bit error rates during cellular communications.

30 Claims, 12 Drawing Sheets

METHOD AND APPARATUS FOR SELF-CALIBRATION AND TESTING OF ZPSK TRANSMITTER/RECEIVER IC'S

BACKGROUND OF THE INVENTION

1. Field of the Invention

The present invention relates to the calibration of transmitter/receivers. More particularly, it relates to QPSK transmitter/receiver IC's and a method and apparatus for the self-calibration and testing thereof.

When communicating with cellular phones, both sides of the communication are transmitting and receiving signals. Upon transmission, the voice signal is modulated and transmitted. The receiver receives the signal and demodulates it to reproduce the transmitted signal. Ideally, the resulting demodulated signal should be identical to the transmitted signal. However, variable parameters such as gain mismatch, offset voltages and phase errors inherent in the signal and circuit cause the demodulated signal to vary from the transmitted signal.

Generally with GSM cellular phones, a Quadrature Phase Shifted Keying (QPSK) modulation scheme is used. QPSK has four vector components for the signals, each of which are 90° apart. This differs from a PSK modulation scheme where there are two vector components 180° apart (e.g., one at 0° and the other at 180°). With QPSK, we have vector components at 45° with a coordinate (1,1); 135° with a coordinate (−1,1); 225° with a coordinate (−1,−1); and, 315° with a coordinate at (1,−1) where the X-axis is the Q channel (quadrature phase) and the Y-axis is the I channel (in phase). For purposes of calculation of the variable parameters, the Q channel can be designated Cosine, and the I channel can be designated Sine.

The amplitude of the four vector components for QPSK, under ideal conditions, would be $\sqrt{2}$. However, since the circuits do not operate ideally, when one modulates a signal and sends it, the demodulated signal on the receiver end does not have the same vector coordinates and amplitude as the originally transmitted signal. Thus, the received signal does not contain the same data.

These inaccuracies are caused by errors in both the transmit and receive channels and mixers. Gain mismatch and offset voltages in both the transmit and receive mixers, in addition to phase errors inherent in both channels result in vector positions that are different than those transmitted.

It would therefore be desirable to have a circuit that enables the performance of a self-calibration technique for determining these error components and which subsequently adds them back to the system in order to numerically correct the demodulated output of the receiver mixer.

SUMMARY OF THE INVENTION

The present invention provides a method and a corresponding circuit implementation which allows parameters such as gain mismatch, offset voltages, and phase errors inherent in the circuit to be measured and compensated for by the digital signal processors to provide minimum bit error rates in the QPSK modulation scheme of the receivers and transmitters.

According to the invention, a circuit and method is provided for determining the variable parameters in QPSK transmitter/receiver IC's and compensating the demodulated signal to substantially eliminate the determined errors upon initiation of a cellular phone call.

It is therefore an object of the present invention to provide a method and apparatus for testing and self-calibrating transmitter/receiver IC's operating in a QPSK modulation scheme.

Another object of the invention is to provide a method and apparatus for determining the errors present in the transmitter/receiver operating in a QPSK modulation scheme.

It is another object of the present invention to provide a method and apparatus that compensates for the errors detected in the QPSK transmitter/receiver.

Yet another object of the invention is to provide a method and apparatus for testing and self-calibrating QPSK transmitter/receiver IC's that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1A:
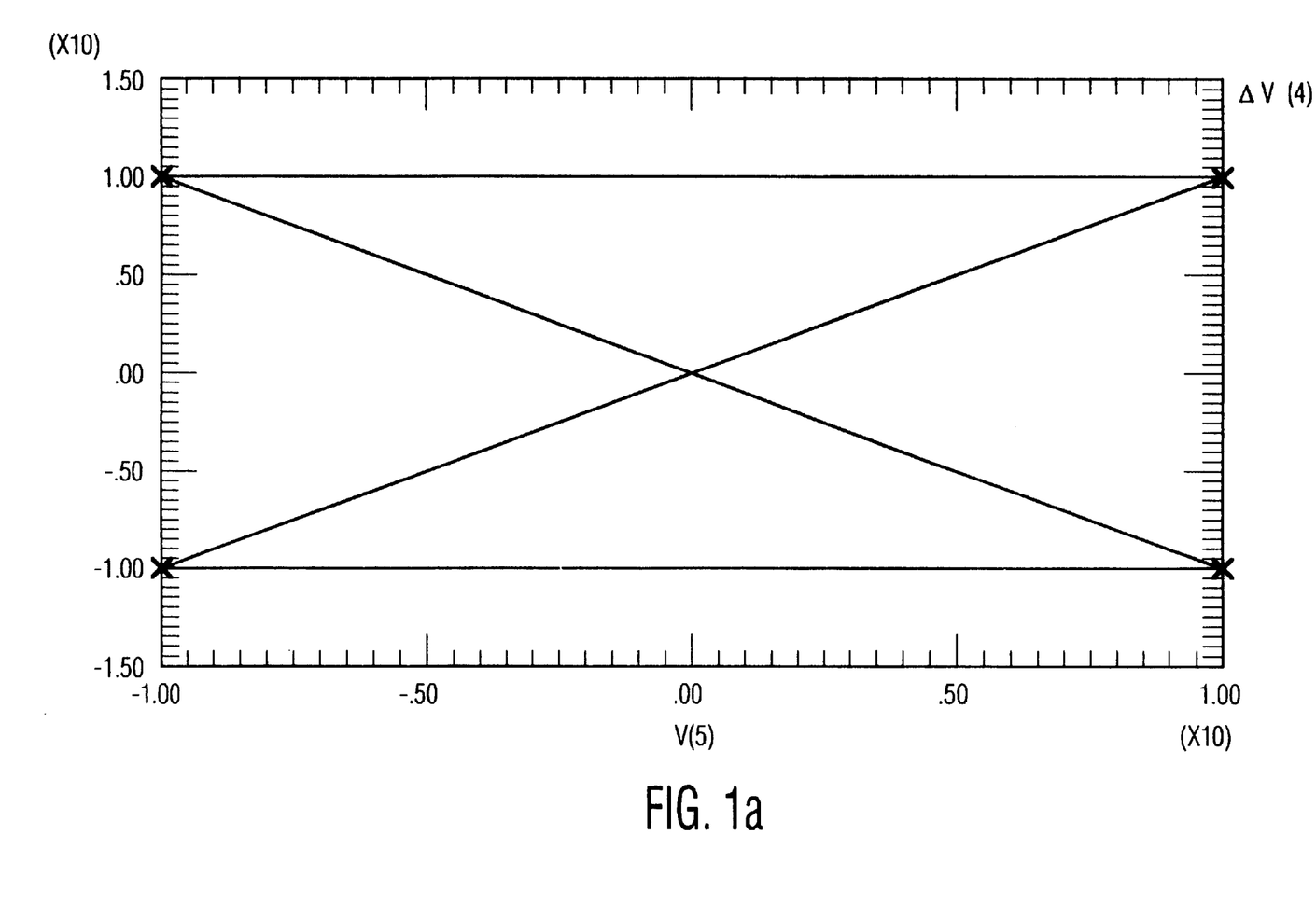
FIG. 1a is a graphical representation of the four ideal vector positions for QPSK.

As described earlier, there are four vector components to the signals when dealing with QPSK modulation. FIG. 1a shows the vector positions for QPSK in the ideal case. The coordinates of each vector, (1,1), (−1,1), (−1,−1) and (1,−1), have been denoted by X. Each of these vectors have an amplitude of $\sqrt{2}$.

The following graphical representations are examples of the effects that various errors in the QPSK transmitter and receiver portions have on the vector components of the signals.

Figure 1B:
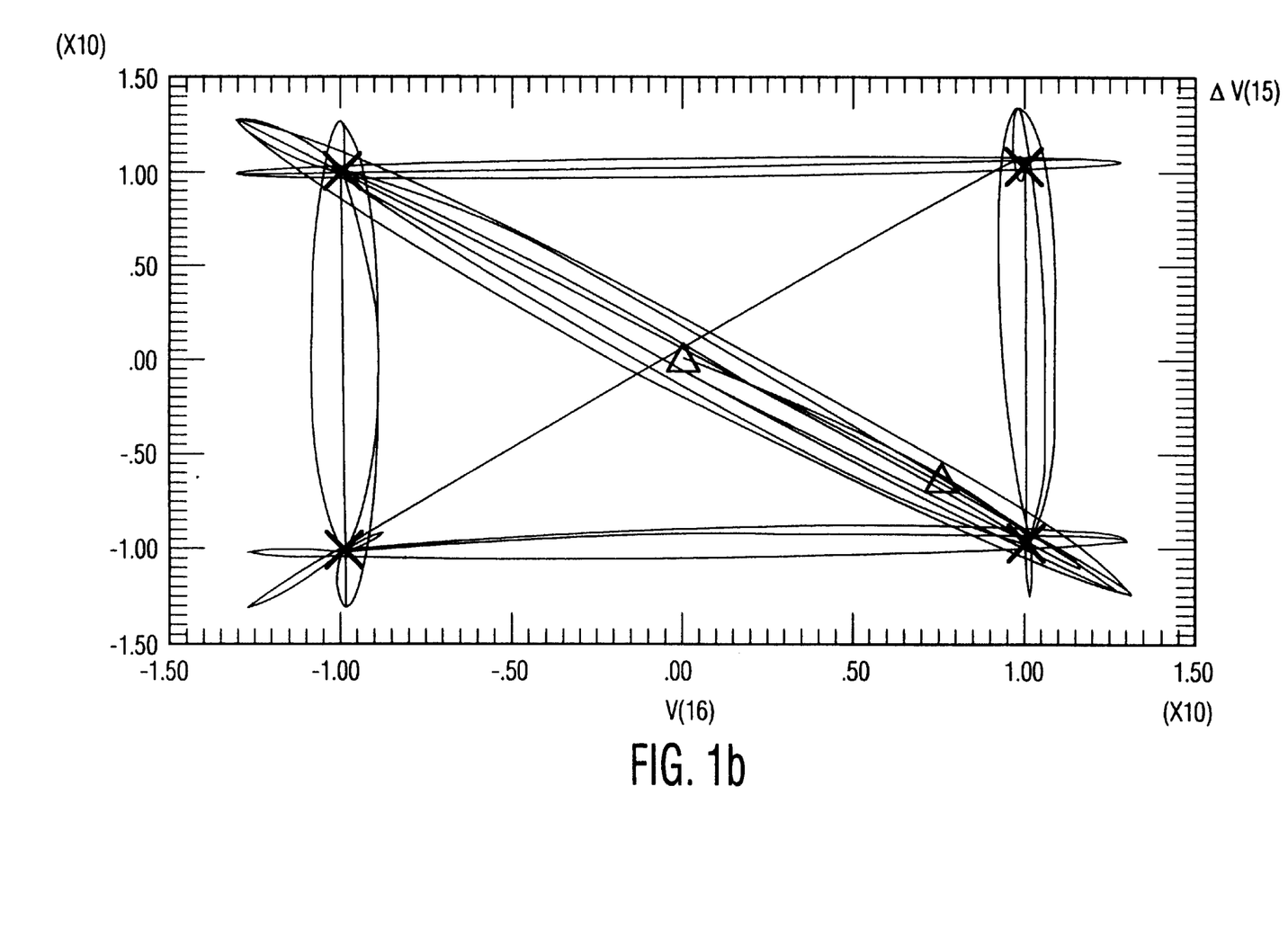
FIG. 1b is a graphical representation of a random vector sequence for the ideal case after demodulation.

FIG. 1b shows the vector positions for QPSK in the ideal case after introducing modulation. The bold X for the ideal vector coordinates falls on the crowded X as a result of the random modulation.

Figure 2:
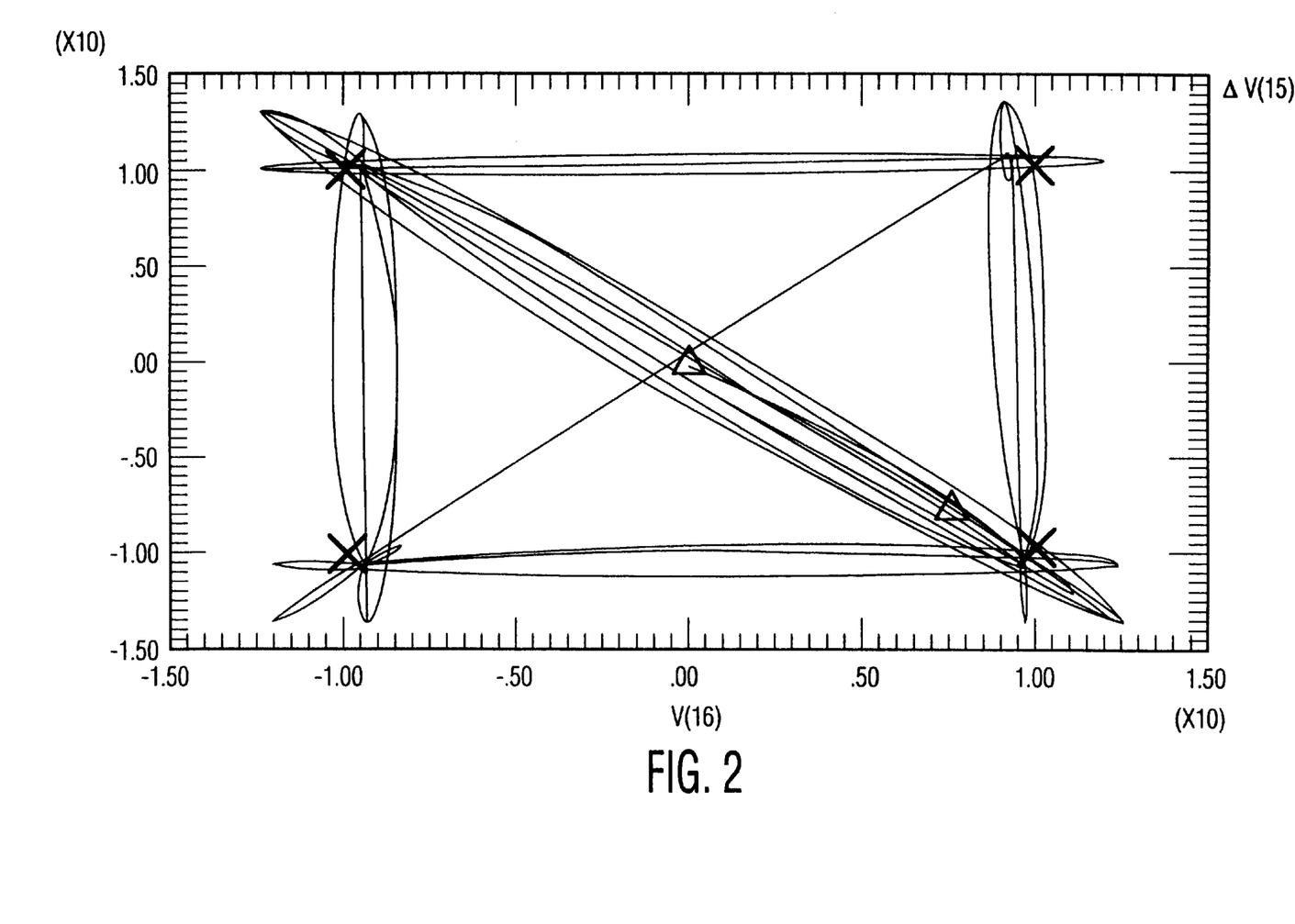
FIG. 2 is a graphical representation of the vector positions where the transmitter mixers have a ±0.5 db gain mismatch.

FIG. 2 shows the vector positions when the I and Q channels of the transmit mixers have a ±0.5 db gain mismatch. The deviation from the ideal case (X) can be clearly seen. Specifically, it has made the Q side smaller than the I side. Thus, all of the points on the Q axis (x axis) have moved inward, whereas the points on the I axis (y axis) really haven't changed much.

Figure 3:
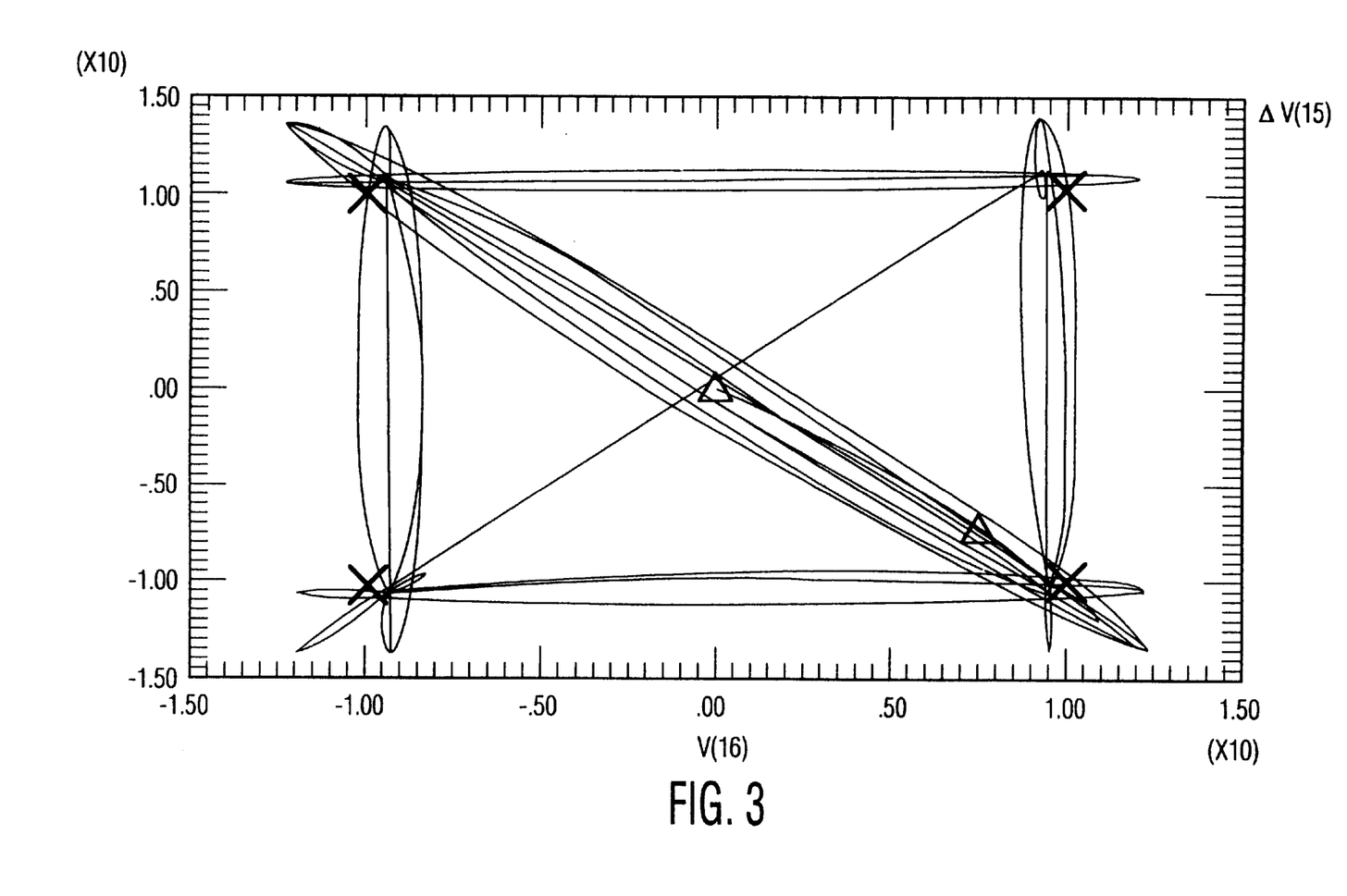
FIG. 3 is a graphical representation of the vector positions where the receiver mixers have a ±0.5 db gain mismatch.

FIG. 3 shows the vector positions when the I and Q channels of the receiver mixers have a ±0.5 db gain mismatch. Note that the net or end result is the same as that shown in FIG. 2. Thus, when there is a gain mismatch in either the transmit or receive path, the end result is the same, and the vector positions change mostly with respect to the Q channel.

Figure 4:
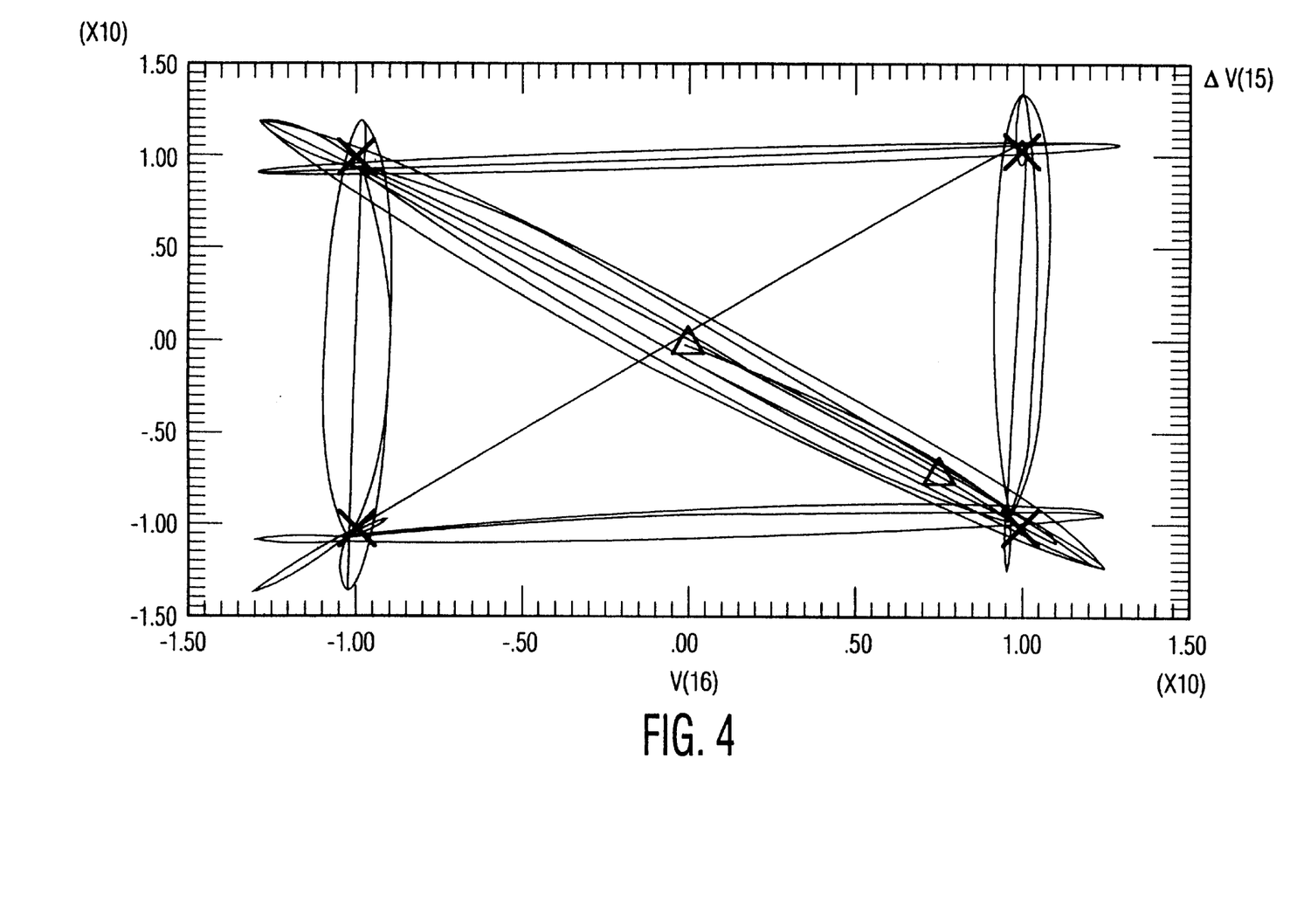
FIG. 4 is a graphical representation of the vector positions when the transmit LO signals are not exactly quadrature.
Figure 5:
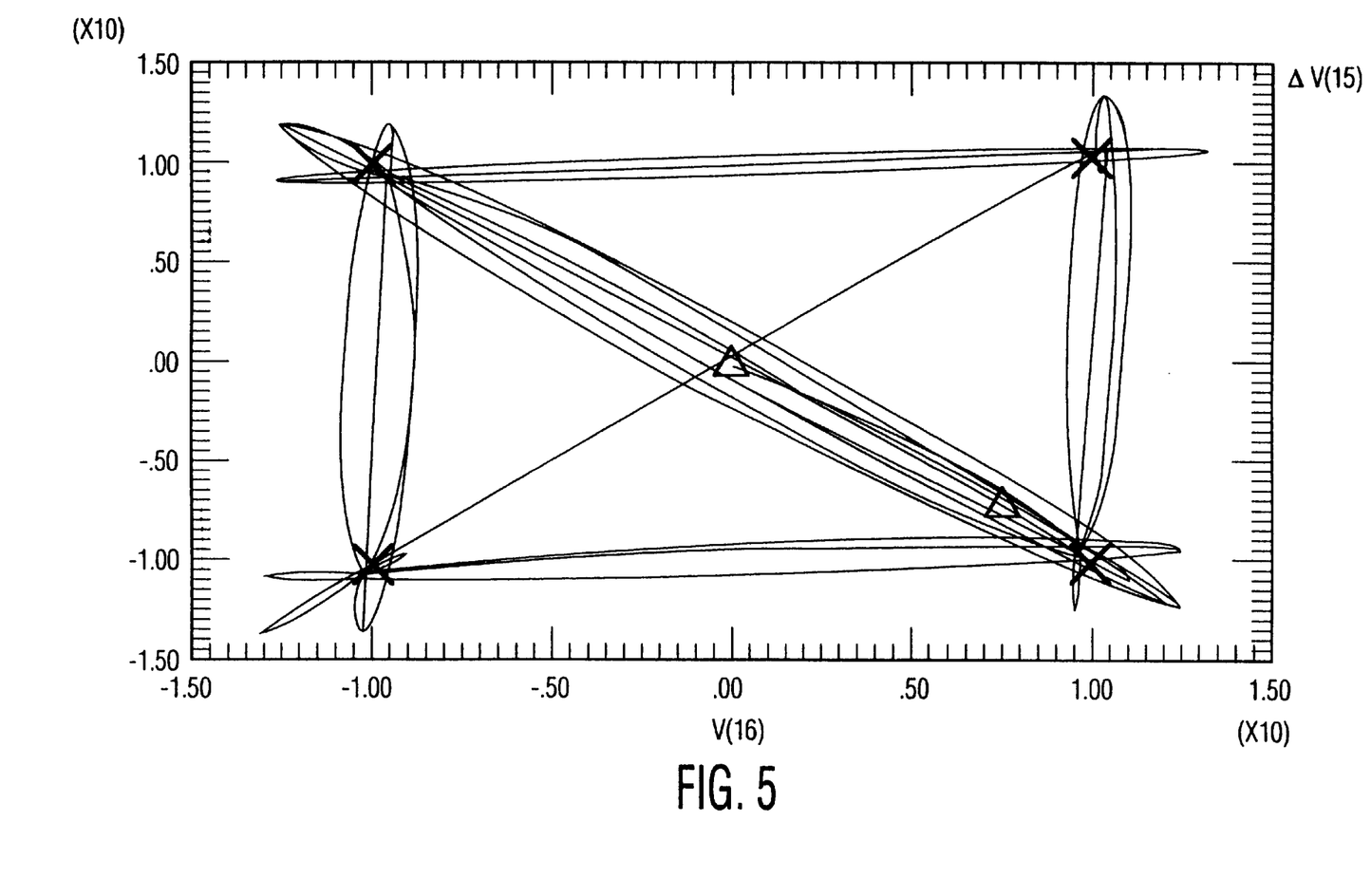
FIG. 5 is a graphical representation of the vector positions when the receiver LO signals are not exactly quadrature.

FIG. 4 shows what happens to the vector positions when the local oscillator (LO) signal going to the transmit mixer is not exactly 90° (i.e., not in quadrature). A 5° phase error has been introduced to show the effect on the vector positions. Thus, having an LO signal that is not exactly 90° can cause the vertical slanting of the ideal vector positions. FIG. 5 shows the same effect of the LO signal inaccuracies in the receiver end. The end result being the same as that of the transmit end. Thus, again, we are showing that is really doesn't matter whether the error is in the receiver or transmitter, the deviation effect is the same.

Figure 6:
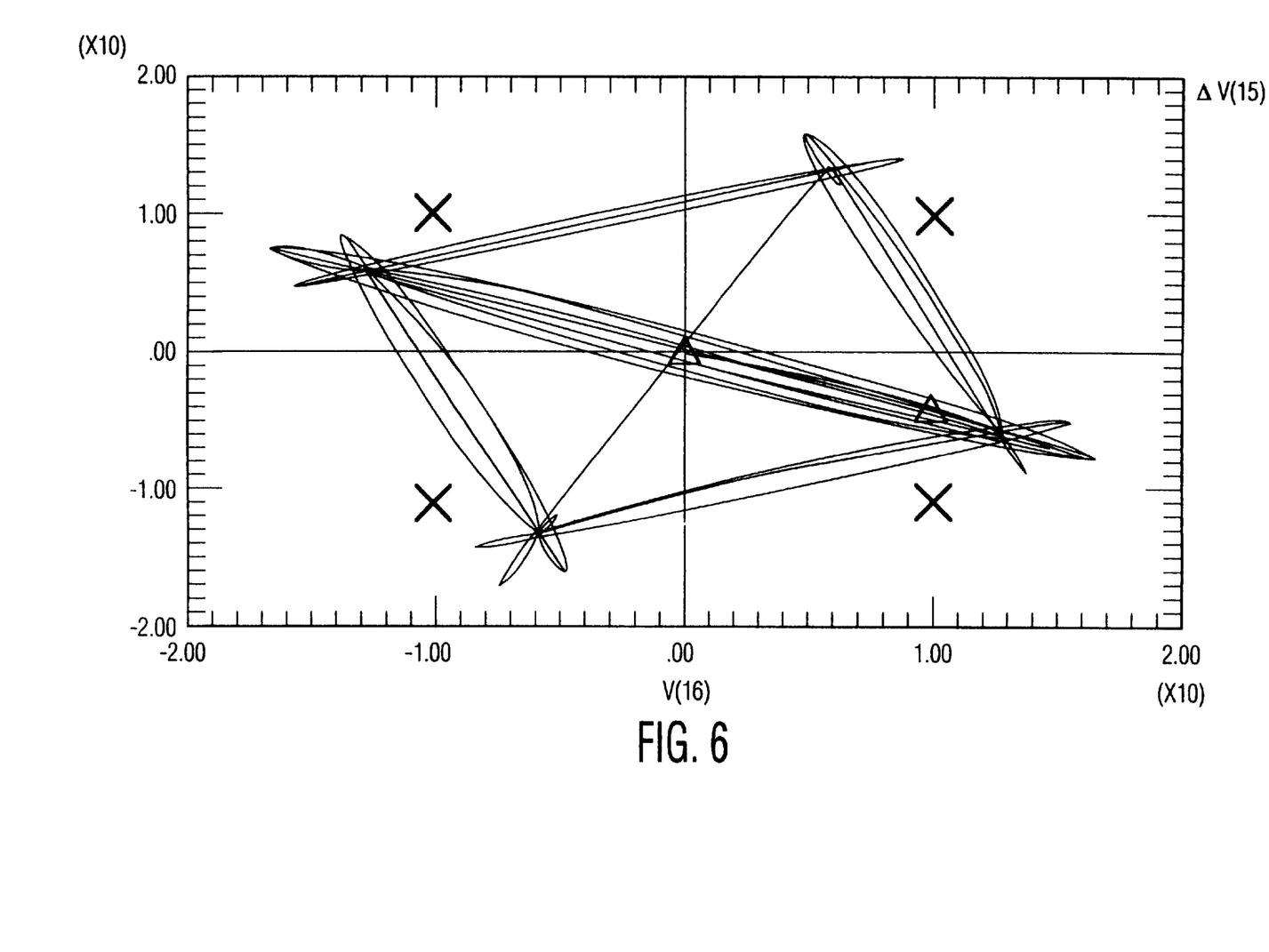
FIG. 6 is a graphical representation of the vector positions when there is a delay between the transmitter signal and the receiver signal due to the communications channel and filters.

FIG. 6 shows the effect of the addition of offsets, gain errors, or any other error that shows itself as a phase shift. The effect of these errors rotate the vectors around the origin. For example, an assumed 20° phase shift would result due to these effects.

Figure 7:
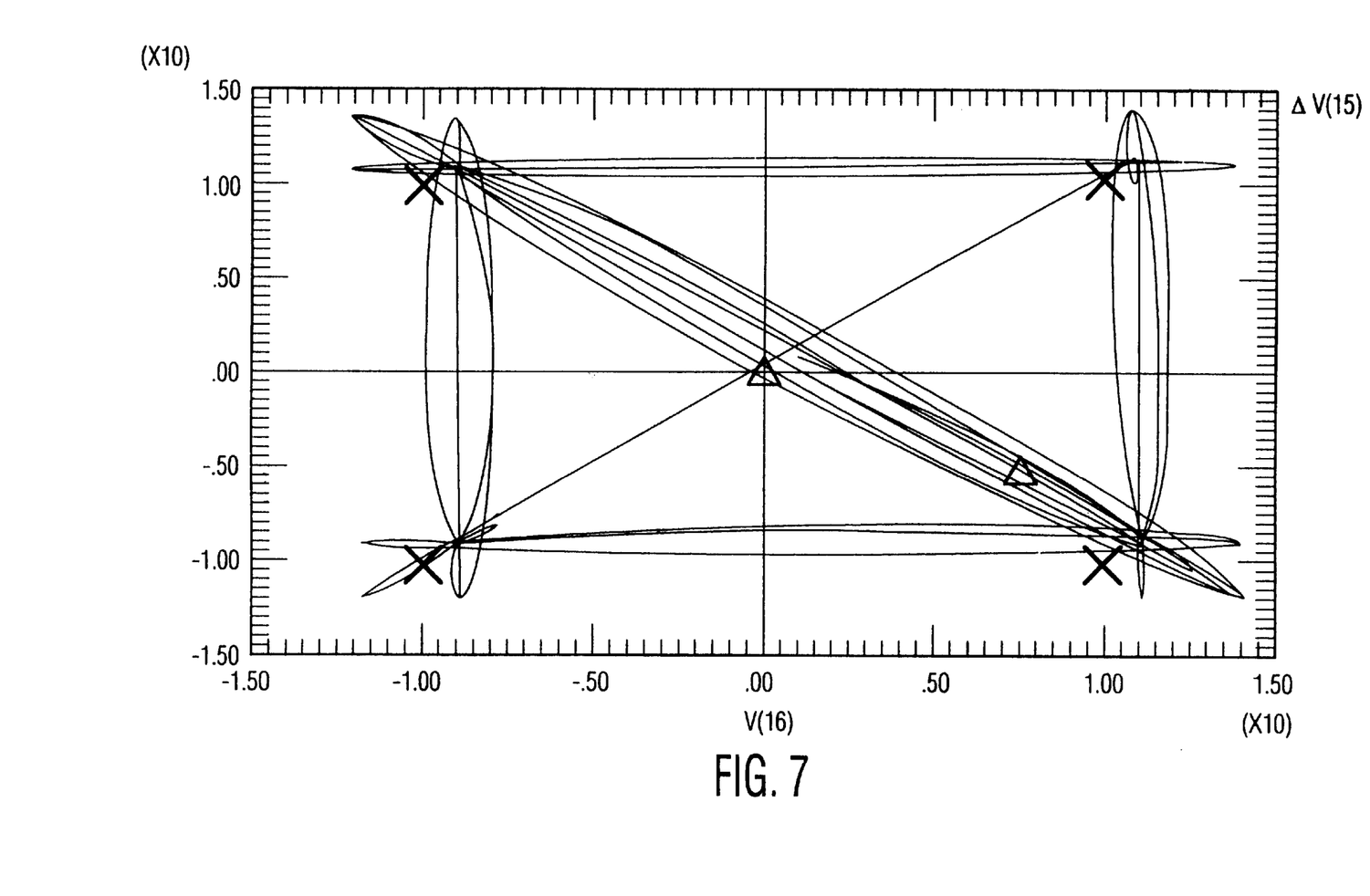
FIG. 7 is a graphical representation of the vector positions when there is a 10% DC offset voltage in the receiver I and Q channels.

FIG. 7 shows the effect of the vector positions when there is a 10% DC offset voltage in the receiver I and Q channels. Here the vector positions shift outward and not with respect to the origin. Thus, the vectors are actually moving from the origin as opposed to changing shape around the origin. The several error situations demonstrated by FIGS. 2–6 show the changing vector positions and shape while the origin remains fixed. However, when a DC offset voltage is introduced, the vectors do not just change shape, they are shifted away from the origin.

Figure 8:
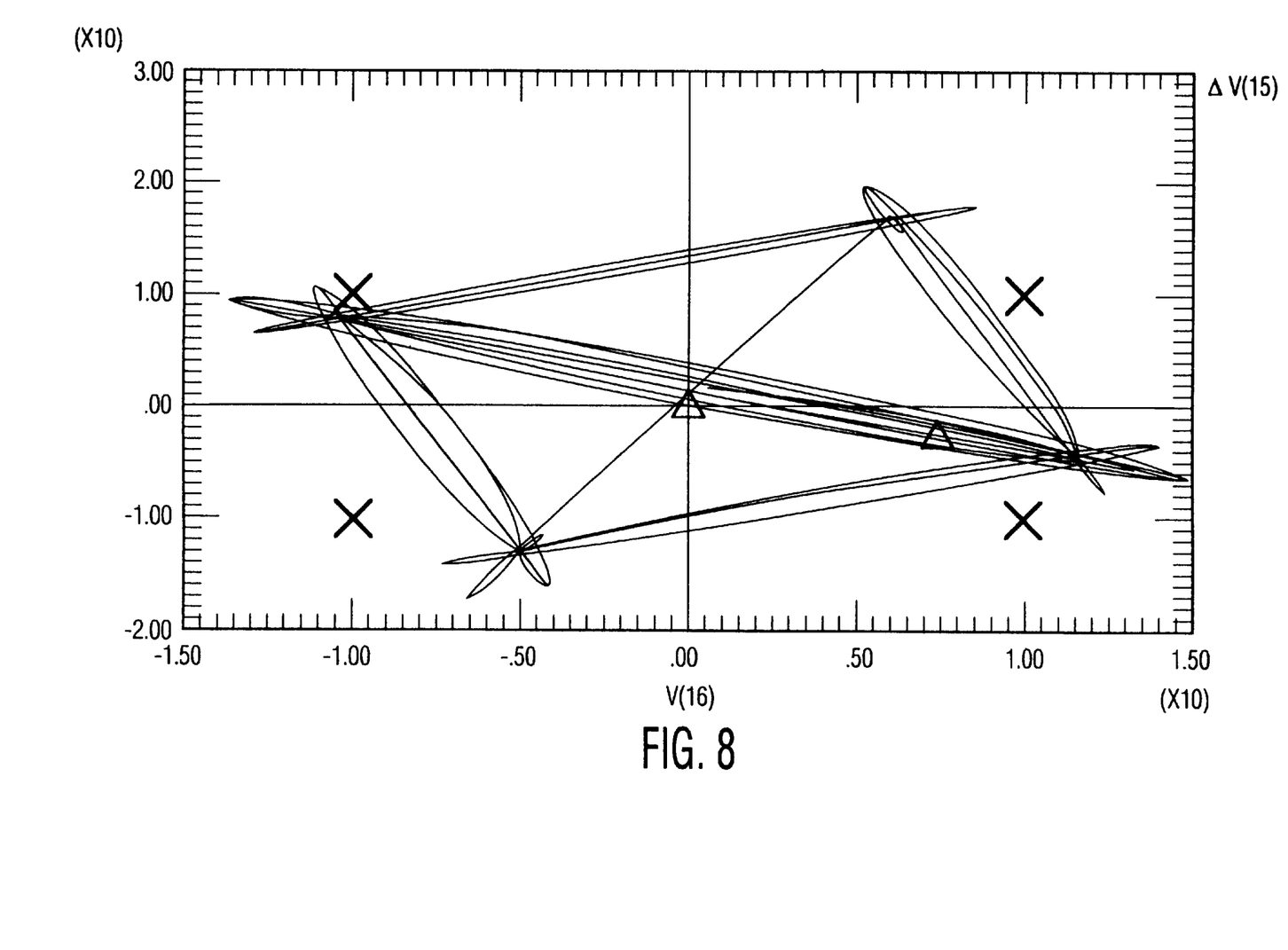
FIG. 8 is a graphical representation of the vector positions when all previous errors of FIGS. 2–7 are combined.

FIG. 8 is an actual case of a received QPSK signal which shows the effect on the vector positions when a combination of all previously discussed errors is made. Thus, the deviation from the ideal case (X) can easily be seen. It becomes readily apparent that there is a need to compensate the received signal to eliminate the effect of these errors on the cellular transmission.

Figure 9:
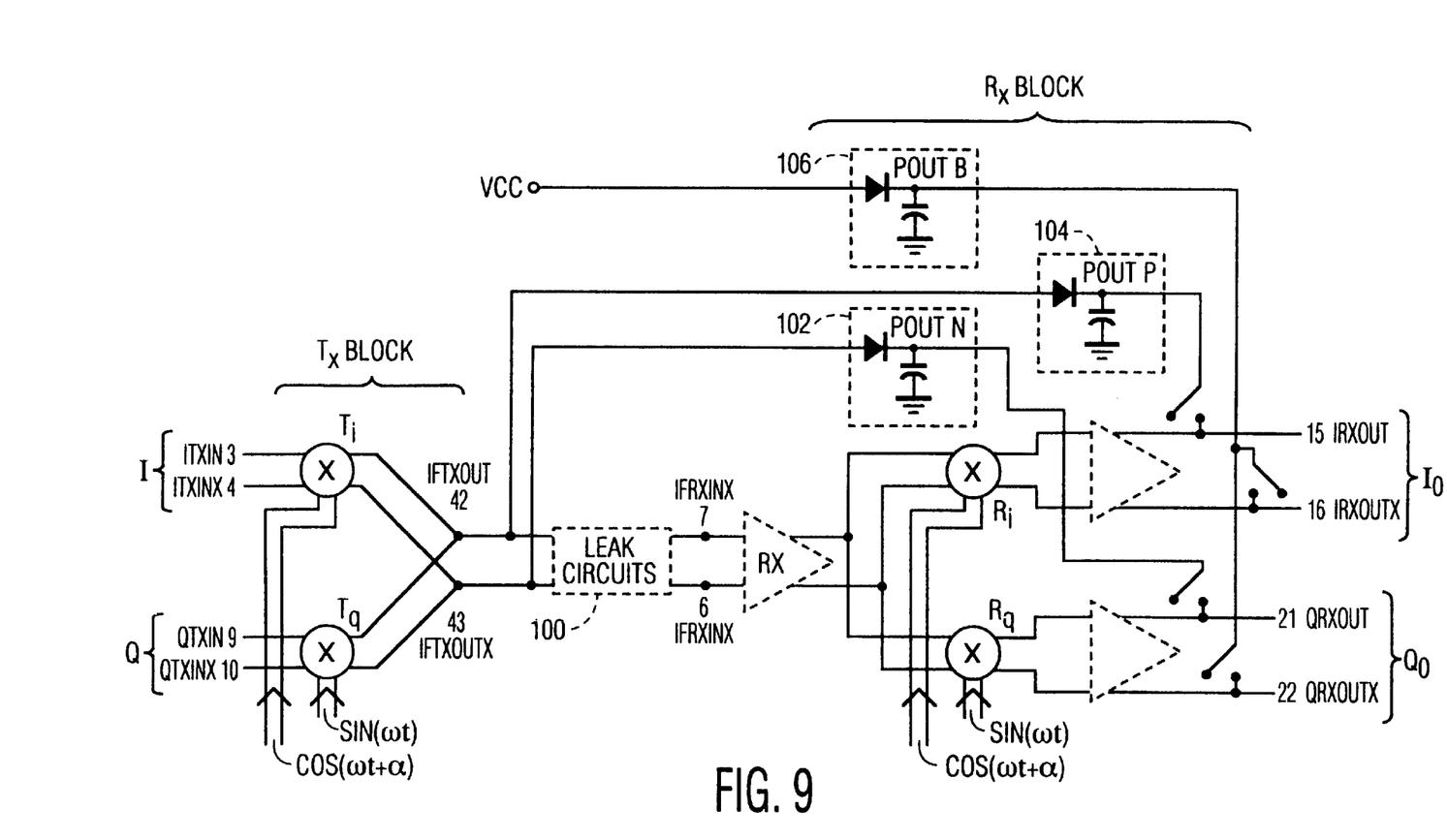
FIG. 9 is a schematic diagram of the circuit according to the invention.

FIG. 9 shows the circuit according to the invention. The circuit has a transmitter block Tx on the left hand side, and the receiver block Rx on the right hand side. A Leak Circuit 100, disposed between the Tx and Rx blocks, enables the attenuation of the transmit signal and the subsequent feed back (loop back) of the transmit signal into the receiver for calibrating the circuit. Leak circuit 100 is not a circuit that is included as part of the receiver design, but it provides a feedback of a small portion of the transmit signal into the receiver.

For example, two cellular phones are communicating with each other. One phone is transmitting and the other phone is receiving. The correction provided by the circuit is between the receiver and transmitter of the same phone. Thus, when one phone is transmitting, that same phone will also receive the signal it is transmitting and thereby enables the corrections to be made in both the transmit and receive blocks of the same phone.

The gain of the transmitter and receiver mixers are depicted by $T_i$ and $R_i$, respectively, for the I channel, and $T_q$ and $R_q$, respectively, for the Q channel. The LO input signals that ideally would be 90°, are depicted by $\cos(\omega t)$ and $\sin(\omega t)$, but because they are not exact, we have introduced $\alpha$, which is a phase error variable of approximately 5°. As such, the LO input is now $\cos(\omega t + \alpha)$.

A group of detectors 102, 104, and 106 are included in the circuit. These detectors are shown as a diode and a capacitor, and the signal of the transmitter mixers can be found on these capacitors. As such, the detectors act as peak detectors.

The transmitter (Tx) block has inputs at pins 3 and 4 of ITxIn and ITxInX, respectively, and pins 9 and 10 of QTxIn and QTxInX. Since I and Q are vectors positions, we have coordinates as inputs for each the I and Q channels. The receiver outputs are depicted at pins 15 and 16 as IRxOut and IRxOutX, respectively, and pins 21 and 22 as QRxOut and QRxOutX, respectively. It is at these output pins 15, 16, 21, and 22, that the measurement for determining the errors in the signal and circuit are taken.

Figure 10A:
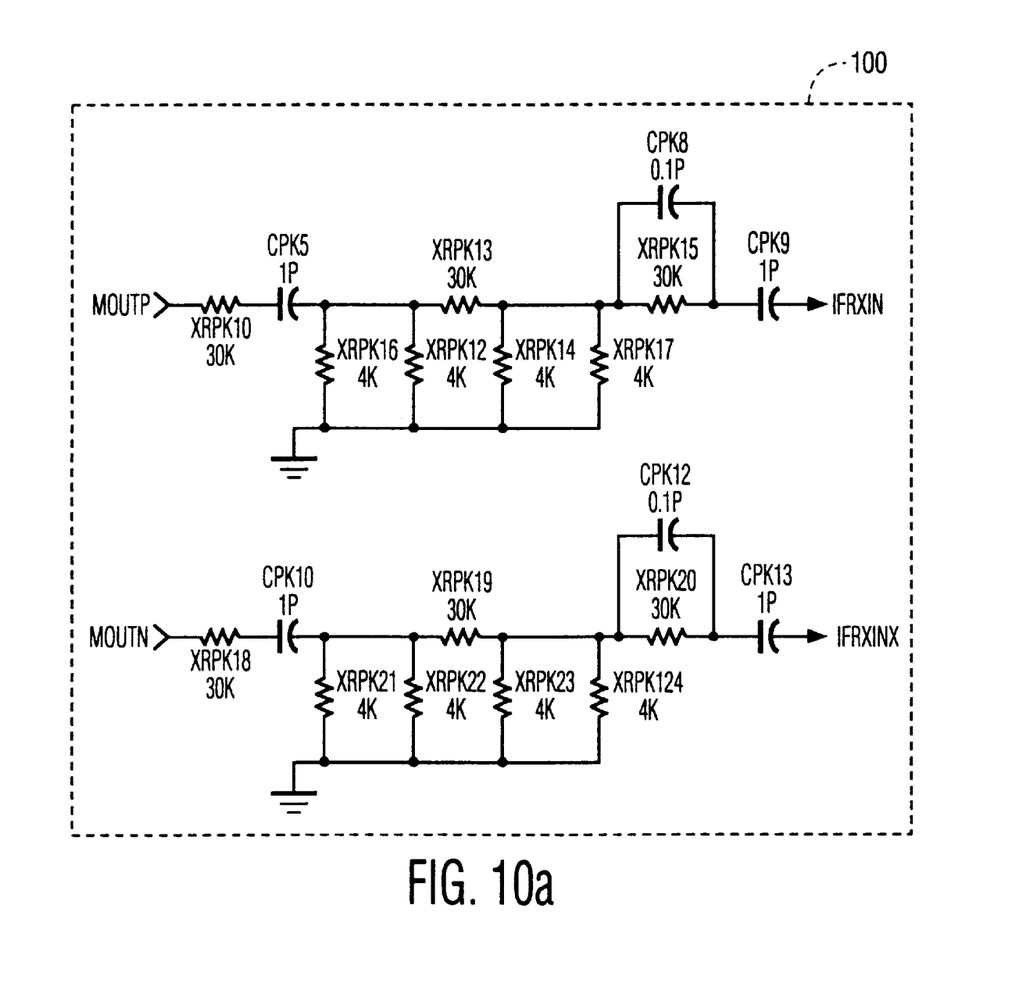
FIG. 10a is a schematic diagram of an embodiment of the leak circuit of FIG. 9.

FIG. 10a shows an example of one implementation of leak circuit 100. The input of leak circuit 100 is the output of the transmitter block (Tx), and the output is the input of the receiver block (Rx). Leak circuit 100 is just an RC network which provides enough attenuation to take the output of the transmit signal and make it very small and feed it back to the receiver.

Figure 10B:
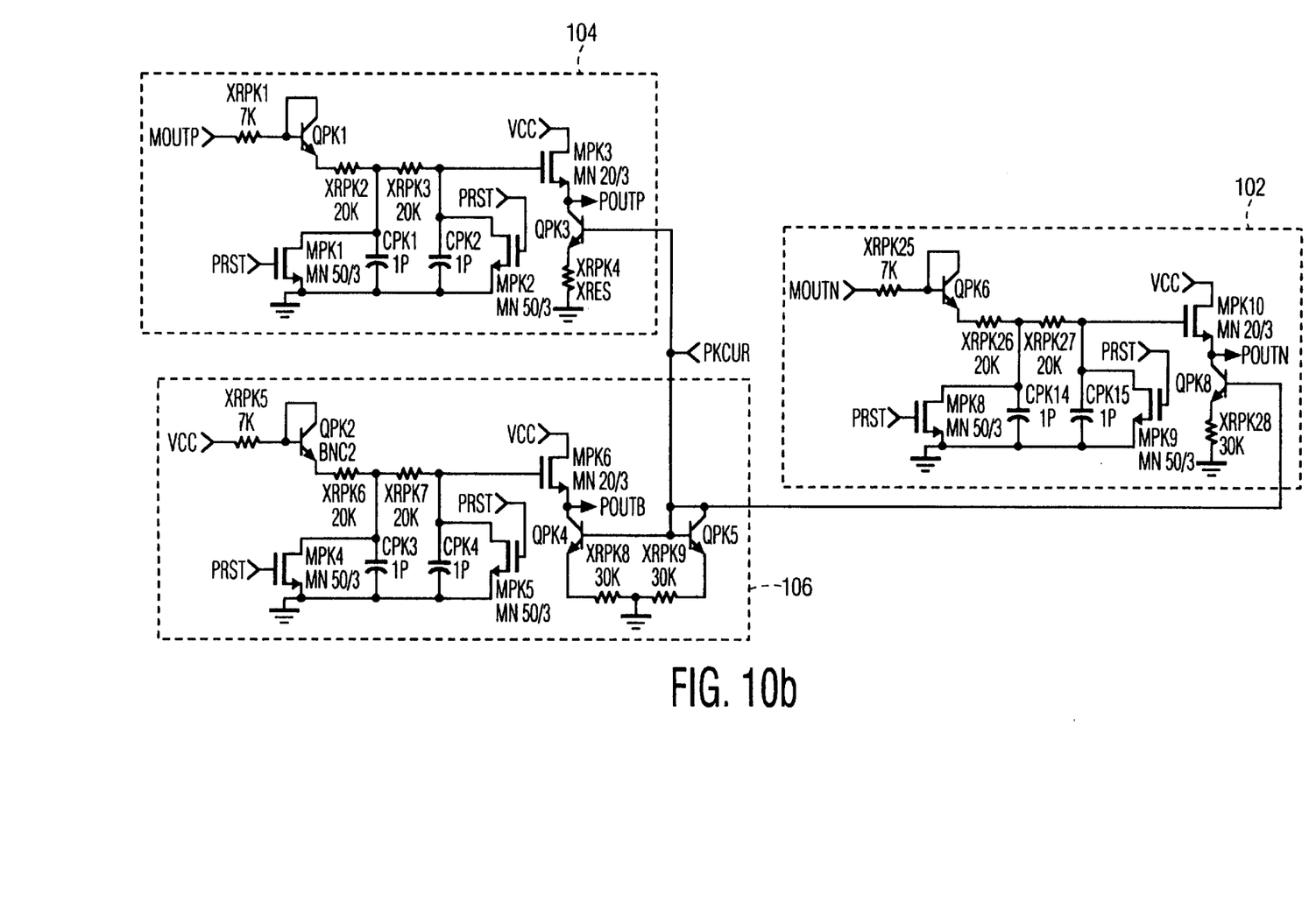
FIG. 10b is a schematic diagram of an embodiment of the peak detector circuits of FIG. 9.

FIG. 10b shows examples of the envelope detectors 102, 104 and 106. Detector 104 has an input MOUTP which goes through a diode where the signal drops by $V_{BE}$, then it continues through the circuit and passes through a buffer (NMOS device) to provide the needed isolation and buffering required and thereby provides the output POUTP. This is an example of the I channel detector. The circuit 102 is identical to that of 104 and is for the Q channel. The remaining detector 106 is also similar to the others, except that the input is $V_{cc}$.

The purpose for detector 106 is to provide a reference point for taking measurements with respect to the corresponding parts of the outputs. Since the outputs at pins 15, 16, 21, and 22 (FIG. 9) are differentials, we measure the output at pin 15 with respect to the output at pin 16, and measure the output at pin 21 with respect to the output at pin 22. Thus, the outputs at pins 16 and 22 become the reference points or common points for our measurements. Therefore, detector 106 provides the needed DC reference to pins 16 and 22 by not being a variable signal but rather a fixed $V_{cc}$ in this case.

Detector 106 includes a current mirror consisting of QPK4, an npn device, and QPK5, a diode connector. A DC current PKCUR (DC biasing current) is injected into the circuit at this point, and the current mirror of QPK4 and QPK5 generates a DC voltage at POUTB which will then be the difference, or reference for making measurements. So the measurements will then be made between the POUTN, for example, and POUTB for the Q channel, and in the other case for the I channel, the measurement is done between POUTP and POUTB.

The transmitter mixers have unequal gains ($T_i$ & $T_q$) and include offset voltages ($V_{fi}$ & $V_{fq}$) at the transmitter inputs. The respective local oscillator (LO) signals are a few degrees off quadrature as indicated by variable $\alpha$. The communications channels introduce another unknown phase shift indicated by $\beta$, and the receiver mixers have unequal gains ($R_i$ & $R_q$). Moreover, the receivers introduce unknown overall offset voltages $V_{offq}$ & $V_{offi}$ for the Q and I channels, respectively. (FIG. 9)

As a result of these variables, we have to come up with a set of measurements that result in the extraction of these variable parameters. For the purpose of this analysis we will assume that the input signals are I and Q and the output signals, after the loop back, are $I_o$ and $Q_o$. We also define the transmitter gain mismatch $D_T=T_i/T_q$ and the receiver gain mismatch $D_R=R_i/R_q$. It can then be shown that the signals coming out of the receiver blocks (Rx) before low pass filtering are:

$$[(E+v_{fi})T_i\ \text{Cos}(\omega t+\alpha+\beta)+(Q+v_{fq})T_q\ \text{Sin}(\omega t+\beta)].R_q\ \text{Sin}(\omega t)+V_{offq} \quad (1)$$

$$[(I+v_{fi})T_i\ \text{Cos}(\omega t+\alpha+\beta)+(Q+v_{fq})T_q\ \text{Sin}(\omega t+\beta)].R_i\ \text{Cos}(\omega t+\alpha)+V_{offi} \quad (2)$$

Expansion of these equations provides multiple components of $2\omega t$. Thus, when we low pass filter these signals, the $2\omega t$ components are canceled out and the resulting signals at the I and Q outputs should be:

$$-I=0.5[(I+v_{fi})T_iR_i\ \text{Cos}(\beta)+(Q+v_{fq})T_qR_i\ \text{Sin}(\beta-\alpha)]+V_{offi} \quad (3)$$

$$Q_o=0.5[(I+v_{fi})T_iR_q(-\text{Sin}(\alpha+\beta))+(Q+v_{fq})T_qR_q\ \text{Cos}(\beta)]+V_{offq} \quad (4)$$

There are 10 unknowns in the above equations (1–4). Since there are four possible inputs, one might assume that making appropriate assumptions about two of the variables (given the four vector positions of I & Q) all of the unknowns can be calculated by solving the resulting set of 8 equations. Unfortunately, however, the resulting equations are not independent. Thus, we need further data to solve for the variable parameters.

If we were to assume there is a possibility of turning off only one of the I and Q channel sides in the transmitter circuit, more equations can be obtained. Thus, if we turn off the Q side and leave the I side active, we arrive at the following two output equations:

$$[(I+v_{fi})T_i\ \text{Cos}(\omega t+\alpha+\beta)].R_i\ \text{Cos}(\omega t+\alpha)+V_{offi} \quad (5)$$

$$[(I+v_{fi})T_i\ \text{Cos}(\omega t+\alpha+\beta)].R_q\ \text{Sin}(\omega t)+V_{offq} \quad (6)$$

Then again, expanding these equations and then low pass filtering to remove the $2\omega t$ components, the resulting signals at the I and Q outputs would be:

$$I_{oi}=0.5[(I+v_{fi})T_iR_i\ \text{Cos}(\beta)]+V_{offi} \quad (7)$$

$$Q_{oi}=0.5[(I+v_{fi})T_iR_q(-\text{Sin}(\alpha+\beta))]+V_{offq} \quad (8)$$

Now, if we turn off the I side of the transmitter and leave the Q side active, we arrive at the following equations:

$$[(Q+v_{fq})T_q\ \text{Sin}(\omega t+\beta)].R_i\ \text{Cos}(\omega t+\alpha)+V_{offi} \quad (9)$$

$$[(Q+v_{fq})T_q\ \text{Sin}(\omega t+\beta)].R_q\ \text{Sin}(\omega t)+V_{offq} \quad (10)$$

Again, expanding these equations and then low pass filtering the signals to remove the $2\omega t$ components, the resulting signals at the I and Q outputs would be:

$$I_{oq}=0.5[(Q+v_{fq})T_qR_i\ \text{Sin}(\beta-\alpha)]+V_{offi} \quad (11)$$

$$Q_{oq}=0.5[(Q+v_{fq})T_qR_q\ \text{Cos}(\beta)]+V_{offq} \quad (12)$$

With these equations, we can begin to calculate the unknowns.

Receiver Offset Voltages

Again by enabling the I and Q path of the transmit section independent of each other, we can determine the receiver offset voltages $V_{offi}$ and $V_{offq}$ for the I and Q channels, respectively.

$$V_{offi}=I_o-I_{oq}-I_{oi} \quad (13)$$

$$V_{offq}=Q_o-Q_{oq}-Q_{oi} \quad (14)$$

Transmitter Gain Mismatch

In this case we use envelope detectors 102, 104, and 106 (FIG. 9) to find the signal level coming out of the transmitter. Therefore we define $E_{di}$ as the I channel signal level, $E_{dq}$ as the Q channel signal level and $E_{V_{cc}}$ as the reference signal.

$$E_{di}=V_{cc}-V_{BE}-V_{GS}+(IT_i)_{peak} \quad (15)$$

$$E_{dq}=V_{cc}-V_{BE}-V_{GS}+(QT_q)_{peak} \quad (16)$$

$$E_{V_{cc}}=V_{cc}-V_{BE}-V_{GS} \quad (17)$$

it is now clear from the above that the transmitter gain ratio will be:

$$D_T=\zeta(E_{di}-E_{V_{cc}})/\zeta(E_{dq}-E_{V_{cc}}) \quad (18)$$

where the function $\zeta$ extracts a DC level proportional to the AC component of the signal.

If we assume that the transmitter input voltages are BG & 0 (case 1) and 0 & BG (case 2) then a second way to calculate the same signal is to use the following equation, $$D_T=(E_{di1}+E_{di2}-2E_{V_{cc}})/(E_{dq1}+E_{dq2}-2E_{V_{cc}}) \quad (19)$$

In this case, the transmitter inputs are driven by static low or high signals as opposed to the previous case where a dynamic input vector was needed.

Transmitter Offset Voltages

If we assume that the transmitter input voltages are BG & 0 (case 1) and 0 & BG (case 2) then the offset voltage can be calculated from $$V_{fi}=V_{BG}(E_{di1}-E_{di2})/(E_{di1}+E_{di2}-2E_{V_{cc}}) \quad (20)$$

$$V_{fq}=V_{BG}(E_{dq1}-E_{dq2})/(E_{dq1}+E_{dq2}-2E_{V_{cc}}) \quad (21)$$

Calculating the $\alpha$ and $\beta$ phase errors The base band input signals I and Q each may be assigned two values which we call H and L. As such, the following equations are derived:

$$I_{oiH}-I_{oiL}=0.5[(H-L)T_iR_i\ \text{Cos}(\beta)] \quad (22)$$

$$I_{oqH}-I_{oqL}=0.5[(H-L)T_qR_i\ \text{Sin}(\beta-\alpha)] \quad (23)$$

$$Q_{oiH}-Q_{oiL}=0.5[(H-L)T_iR_q(-\text{Sin}(\alpha+\beta))] \quad (24)$$

$$Q_{oqH}-Q_{oiL}=0.5[(H-L)T_qR_q\ \text{Cos}(\beta)] \quad (25)$$

$$(I_{oqH}-I_{oqL})/(I_{oiH}-I_{oiL})=(T_q/T_i)(\text{Sin}(\beta-\alpha)/\text{Cos}(\beta)) \quad (26)$$

$$(Q_{oiH}-Q_{oiL})/(Q_{oqH}-Q_{oqL})=(T_i/T_q)(-\text{Sin}(\alpha+\beta)/\text{Cos}(\beta)) \quad (27)$$

If we define two more auxiliary variables X and Y such that $$(I_{oqH}-I_{oqL})/(I_{oiH}-I_{oiL})=(T_q/T_i)Y \quad (28)$$

$$(Q_{oiH}-Q_{oiL})/(Q_{oqH}-Q_{oqL})=(T_i/T_q)(-X) \quad (29)$$

$$Y=\text{Sin}(\beta-\alpha)/\text{Cos}(\beta) \quad (30)$$

$$X=\text{Sin}(\alpha+\beta)/\text{Cos}(\beta) \quad (31)$$

$$Y\ \text{Cos}(\beta)=\text{Cos}(\alpha)\text{Sin}(\beta)-\text{Cos}(\beta)\text{Sin}(\alpha) \quad (32)$$

$$X\ \text{Cos}(\beta)=\text{Cos}(\alpha)\text{Sin}(\beta)+\text{Cos}(\beta)\text{Sin}(\alpha) \quad (33)$$

The values of α and β can then be easily calculated to be:

$$\alpha = \sin^{-1}[(X-Y)/2] \quad (34)$$

$$\beta = tg^{-1}[(X+Y)/(2\cos(\alpha))] \quad (35)$$

Receiver Gain Mismatch

From the equations obtained above, the receiver gain mismatch $D_R$ will be obtained from the following equations:

$$D_R D_T = (I_{oiH} - I_{oiL})/(Q_{oqH} - Q_{oqL}) \quad (36)$$

where $D_T$ and $D_R$ were previously defined to be $D_T = T_i/T_q$ and $D_R = R_i/R_q$.

In order to perform these calculations and determine the unknowns, it is necessary to have control over the I & Q channels independently, in addition to enabling the activation and deactivation of the receiver section. This control is provided by logic control signals TC5, TC6, TC7, TC10 and TC11. (FIG. 9) These logic signals actually enable and disable the different paths of the circuit and thereby allow more measurements to be obtained.

The logic control signals are provided from a microprocessor, or other form of intelligence, within the cellular phone upon initiation of a call. Upon initiation, these control signals become part of the input and the measurements are taken to determine what errors are present in the channels and circuit. These error determinations are based on the present conditions such as, for example, temperature, location, etc. Once the measurements are made and calibration is complete, the need for the logic signals is complete.

Control signal TC5 activates the loop back (feedback) of a small part of the transmit signal into the receiver, and thereby allows calibration measurements to be taken. A high TC5 signal enables the loop back of the transmit signal. Once the calibration is complete, TC5 goes low and deactivates the loop back condition. Signals TC6 and TC7 control the turning on and off of the I and Q channels of the transmitter block independent of each other. As explained earlier, this enables the determination of additional equations (5–14), and the subsequent calculation of the error components. The signal definition for control signals TC6 and TC7 can be as follows:

| TC6 | TC7 | |
|-----|-----|---|
| L | L | Transmit I & Q channel powered up |
| L | H | Transmit I channel powered up, Q powered down |
| H | L | Transmit Q channel powered up, I powered down |
| H | H | Transmit I & Q channel powered up |

Control signal TC10 enables the discharge of the capacitors in peak detectors 102, 104, and 106. Every time a new call is initiated, and a new set of measurements need to be taken, the capacitors within peak detectors 102, 104, and 106 must be discharged because there may still be information from previous measurements stored therein. Thus, upon initiation of the call, control signal TC10 discharges these capacitors by simply shorting them out. When TC10 is low, the detectors are left open, and when TC10 is high, the detector capacitors are shorted.

Control signal TC11 enables the deactivation of the receiver section Rx in order to take the necessary measurements in the transmitter portion. Thus, when TC11 is low, the receiver section is powered up, and when it is high, the receiver section is powered down.

While one embodiment of the present invention has been shown and described, it is to be understood that many changes and modifications may be made thereunto without departing from the spirit and scope of the invention as defined in the appended claims.

What is claimed is:

1. A method of self calibrating and testing QPSK transmitter/receiver IC's having a transmitter block and a receiver block, said method comprising the steps of:

determining the errors present in each of the QPSK transmitter and receiver blocks and signals upon initiation of a transmission, said step of determining including leaking a small part of the transmitter block output signal into the receive block; and compensating for the determined errors to provide a substantially error free connection between the QPSK transmitter/receiver IC's.

2. The method according to claim 1, wherein said step of determining the errors present in the circuit and signal further comprises the steps of:

generating a set of mathematical equations having variables representative of the determined errors; and calculating the numerical values of the variables representative of the determined errors.

3. The method according to claim 2, wherein said step of generating a set of mathematical equations having variables representative of the determined errors further comprises the steps of:

providing logic control signals that selectively enable the activation and deactivation of specific sections of a test circuit; and measuring the signals generated when each of the selective sections of the test circuit have been activated and deactivated.

4. The method according to claim 3, wherein said step of providing the logic signals is performed by an internal intelligence circuit separate from the test circuit.

5. The method according to claim 4, wherein said step of compensating for the determined errors includes the step of adding the determined numerical values of the errors to the demodulated signal of the QPSK transmitter/receiver.

6. The method according to claim 1, wherein said steps of determining and compensating are performed upon the initiation of a cellular transmission.

7. A circuit for the self-calibration and testing of QPSK transmitter/receiver IC's comprising:

a transmitter block having a transmit signal input, an LO signal input and a mixed transmit signal output;

a leak circuit having an input connected to said mixed transmit signal output of said transmitter block and an output;

a receiver block having an input connected to said output of said leak circuit, an LO signal input, and an output, said leak circuit enabling the feedback of a small part of the output transmit signal into the receiver block;

detector means having an input connected to said output of said transmitter block, a reference source input, an output representative of the peaks of the mixed output transmit signal and a reference source output;

said output of said receiver block and said reference source output enable the measurement of the circuit operation for determining the errors contained in a given transmit signal, the receiver block and the transmit block; and compensating means for compensating the transmitter and receiver blocks to counteract the determined errors to provide a substantially error free connection between the transmitter and receiver blocks.

8. The method according to claim 7, wherein said transmit signal input comprises an I channel input and a Q channel input, said receiver mixer block input comprises an I channel input and a Q channel input, and said output of said receiver comprises an I channel and a Q channel output.

9. The circuit according to claim 8, further comprising control means for selectively activating and deactivating said I channel, Q channel and said receiver block for enabling additional measurements of the circuit operation for further calculation of the errors contained in the circuit and the transmit signal being processed.

10. The circuit according to claim 9, wherein said control means comprises a plurality of logic control signals provided from a source external to the circuit.

11. The circuit according to claim 9, wherein said control means is coupled to said detector means and further includes means for inputting static DC signals to said I and Q channel inputs and said LO signal inputs of said transmitter and receiver blocks for measuring each of the following parameters:

the transmitter offset voltages $V_{fi}$ and $V_{fq}$ of said I and Q channel inputs of said transmitter block;

the transmitter gains $T_i$ and $T_q$, respectively, of the I and Q channels of said transmitter block;

the receiver offset voltages $V_{offi}$ and $V_{offq}$ of said I and Q channel inputs of said receiver block;

the receiver gains $R_i$ and $R_q$, respectively, of the I and Q channels of said receiver block; and the phase shift ($\alpha$) of the LO signals and the phase shift ($\beta$) within the transmitter and receiver blocks.

12. The circuit according to claim 11, wherein said control means determines said I channel receiver offset voltage $V_{offi}$ according to the equation:

$$V_{offi}=I_o-I_{oq}-I_{oi},$$

wherein $I_o$=the I channel receiver output with both the I and Q channels active after loopback of a static I channel input signal;

$I_{oq}$=the I channel receiver output after loopback of the static I channel input signal into said receiver block with only the Q channel active and the I channel deactivated by said control means; and $I_{oi}$=the I channel receiver output after loopback of the static I channel input signal into said receiver block with only the I channel active and the Q channel deactivated by said control means.

13. The circuit according to claim 11, wherein said control means determines said Q channel receiver offset voltage $V_{offq}$ according to the equation:

$$V_{offq}=Q_o-Q_{oq}-Q_{oi},$$

wherein $Q_o$=the Q channel receiver output with both the I and Q channels active after loopback of a static Q channel input signal;

$Q_{oq}$=the Q channel receiver output after loopback of the static Q channel input signal into said receiver block with only the Q channel active and the I channel deactivated by said control means; and $Q_{oi}$=the Q channel receiver output after loopback of the static Q channel input signal into said receiver block with only the I channel active and the Q channel deactivated by said control means.

14. The circuit according to claim 11, wherein said control means determines the transmitter gain mismatch $D_T$ by inputting static input signals I and Q, respectively, to said I and Q transmitter input channels according to the equation:

$$D_T=(E_{di1}+E_{di2}-2EV_{cc})/(E_{dq1}+E_{dq2}-2EV_{cc}),$$

wherein $EV_{cc}$=said reference source input to said detector means;

$E_{di1}$=the signal level of the I channel transmitter output resulting from a first static I channel input signal;

$E_{di2}$=the signal level of the I channel transmitter output resulting from a second, different static I channel input signal;

$E_{dq1}$=the signal level of the Q channel transmitter output resulting from a first static Q channel signal input equal to said first I channel input signal; and $E_{dq2}$=the signal level of the Q channel transmitter output resulting from a second, different Q channel input signal equal to the second I channel input signal.

15. The circuit according to claim 11, wherein said control means determines the transmitter offset voltage $V_{fi}$ of the I channel transmitter input according to the equation:

$$V_{fi}=V_{BG}(E_{di1}-E_{di2})/(E_{di1}+E_{di2}-2EV_{cc}),$$

wherein $EV_{cc}$=said reference source input to said detector means;

$E_{di1}$=the signal level of the I channel transmitter output resulting from a first static I channel input signal equal to a non-zero static voltage $V_{BG}$;

$E_{di2}$=the signal level of the I channel transmitter output resulting from a second static I channel input signal of 0.

16. The circuit according to claim 11, wherein said control means determines the transmitter offset voltage $V_{fq}$ of the Q channel transmitter input according to the equation:

$$V_{fq}=V_{BG}(E_{dq1}-E_{dq2})/(E_{dq1}+E_{dq2}-2E_{Vcc}),$$

wherein $E_{Vcc}$=said reference source input to said detector means;

$E_{dq1}$=the signal level of the I channel transmitter output resulting from a first static I channel input signal equal to a non-zero static voltage $V_{BG}$;

$E_{dq2}$=the signal level of the I channel transmitter output resulting from a second static I channel input signal of 0.

17. The circuit according to claim 11, wherein said control means calculates the said ($\alpha$) phase error according to the following equation:

$$(\alpha)=\text{Sin}^{-1}[(X-Y)/2],$$

wherein $X=-T_q(Q_{oiH}-Q_{oiL})/T_i(Q_{oqH}-Q_{oqL});$ $Y=T_i(I_{oqH}-I_{oqL})/T_q(I_{oiH}-I_{oiL});$ $I_{oiH}$=the I channel receiver output signal, after loopback into said receiver block and with the Q channel deactivated by said control means, resulting from an I channel baseband input having a value H;

$I_{oiL}$=the I channel receiver output signal, after loopback into said receiver block and with the Q channel deactivated by said control means, resulting from an I channel baseband input having a value L;

$Q_{oqH}$=the Q channel receiver output signal, after loopback into said receiver block and with the I channel deactivated by said control means, resulting from a Q channel baseband input having a value H;

$Q_{oqL}$=the Q channel receiver output signal, after loopback into said receiver block and with the I channel deactivated by said control means, resulting from a Q channel baseband input having a value H;

$T_i$=the I channel transmitter gain; and $T_q$ is the Q channel transmitter gain.

18. The circuit according to claim 17, wherein said control means calculates said (β) phase error according to the equation:

$$(\beta)=tg^{-1}[(X+Y)/2(\cos(\alpha))].$$

19. The circuit according to claim 11, wherein said control means determines said receiver gain mismatch $D_R$ according to the following equation:

$$D_R=(I_{oiH}-I_{oiL})/[D_T(Q_{oqH}-Q_{oqL})],$$

wherein $I_{oiH}$=the I channel receiver output signal, after loopback into said receiver block and with the Q channel deactivated by said control means, resulting from an I channel baseband input having a value H;

$I_{oiL}$=the I channel receiver output signal, after loopback into said receiver block and with the Q channel deactivated by said control means, resulting from an I channel baseband input having a value L;

$Q_{oqH}$=the Q channel receiver output signal, after loopback into said receiver block and with the I channel deactivated, resulting from a Q channel baseband input having a value H by said control means;

$Q_{oqL}$=the Q channel receiver output signal, after loopback into said receiver block and with the I channel deactivated, resulting from a Q channel baseband input having a value H by said control means; and $D_T$=Ti/Tq, where Ti is the I channel transmitter gain and Tq is the Q channel transmitter gain.

20. The circuit according to claim 11, wherein said control means determines each of said parameters with only static input signals.

21. The circuit according to claim 7, wherein said control means determines each of said parameters with only static input signals.

22. The method according to claim 1, wherein the transmitter/receiver IC includes (a) a transmitter block having I and Q channel transmitter inputs, I and Q channel transmitter mixer outputs, an LO signal input and (b) a receiver block including I and Q channel receiver inputs, I and Q channel receiver output, and a LO signal input, and wherein said step of determining determines each of the following parameters:

the transmitter offset voltages $V_{fi}$ and $V_{fq}$ of said I and Q channel inputs of the transmitter block;

the transmitter gains $T_i$ and $T_q$, respectively, of the I and Q channels of said transmitter block;

the receiver offset voltages $V_{offi}$ and $V_{offq}$ of said I and Q channel inputs of the receiver block;

the receiver gains $R_i$ and $R_q$, respectively, of the I and Q channels of said receiver block; and the phase shift (α) of the LO signals and the phase shift (β) within the transmitter and receiver blocks.

23. The method according to claim 22, wherein said determining step determines said I channel receiver offset voltage $V_{offi}$ according to the equation:

$$V_{offi}=I_o-I_{oq}-I_{oi},$$

wherein $I_o$=the I channel receiver output with both the I and Q channels active after loopback of a static I channel input signal;

$I_{oq}$=the I channel receiver output after loopback of the static I channel input signal into said receiver block with only the Q channel active and the I channel deactivated by said control means; and $I_{oi}$=the I channel receiver output after loopback of the static I channel input signal into said receiver block with only the I channel active and the Q channel deactivated.

24. The method according to claim 22, wherein said control means determines said Q channel receiver offset voltage $V_{offq}$ according to the equation:

$$V_{offq}=Q_o-Q_{oq}-Q_{oi},$$

wherein $Q_o$=the Q channel receiver output with both the I and Q channels active after loopback of a static Q channel input signal;

$Q_{oq}$=the Q channel receiver output after loopback of the static Q channel input signal into said receiver block with only the Q channel active and the I channel deactivated; and $Q_{oi}$=the Q channel receiver output after loopback of the static Q channel input signal into said receiver block with only the I channel active and the Q channel deactivated.

25. The method according to claim 22, wherein said step of determining determines the transmitter gain mismatch $D_T$, by inputting static input signals I and Q, respectively, to the I and Q transmitter input channels, from the equation:

$$D_T=(E_{di1}+E_{di2}-2EV_{cc})/(E_{dq1}+E_{dq2}-2EV_{cc}),$$

wherein $EV_{cc}$=said reference source input to said detector means;

$E_{di1}$=the signal level of the I channel transmitter output resulting from a first static I channel input signal;

$E_{di2}$=the signal level of the I channel transmitter output resulting from a second, different static I channel input signal;

$E_{dq1}$=the signal level of the Q channel transmitter output resulting from a first static Q channel signal input equal to said first I channel input signal; and $E_{dq2}$=the signal level of the Q channel transmitter output resulting from a second, different Q channel input signal equal to the second I channel input signal.

26. The method according to claim 22, wherein said step of determining determines the transmitter offset voltage $V_{fi}$ of the I channel transmitter input from the equation:

$$V_{fi}=V_{BG}(E_{di1}-E_{di2})/(E_{di1}+E_{di2}-2EV_{cc}),$$

wherein $EV_{cc}$=said reference source input to said detector means;

$E_{di1}$=the signal level of the I channel transmitter output resulting from a first static I channel input signal equal to a non-zero static voltage VBG;

$E_{di2}$=the signal level of the I channel transmitter output resulting from a second static I channel input signal of 0.

27. The method according to claim 22, wherein said step of determining determines the transmitter offset voltage $V_{fq}$ of the Q channel transmitter input from the equation:

$$V_{fq} = V_{BG}(E_{dq1} - E_{dq2})/(E_{dq1} + E_{dq2} - 2EV_{cc}),$$

wherein $EV_{cc}$=said reference source input to said detector means;

$E_{dq1}$=the signal level of the I channel transmitter output resulting from a first static I channel input signal equal to a non-zero static voltage VBG;

$E_{dq2}$=the signal level of the I channel transmitter output resulting from a second static I channel input signal of 0.

28. The method according to claim 22, wherein said step of determining determines said ($\alpha$) phase error according to the following equation:

$$(\alpha) = \sin^{-1}[(X-Y)/2],$$

wherein $$X = -T_q(Q_{oiH} - Q_{oiL})/T_i(Q_{ogH} - Q_{ogL});$$

$$Y = T_i(I_{oqH} - I_{oqL})/T_q(I_{oiH} - I_{oiL});$$

$I_{oiH}$=the I channel receiver output signal, after loopback and with the Q channel deactivated, resulting from an I channel baseband input having a value H;

$I_{oiL}$=the I channel receiver output signal, after loopback and with the Q channel deactivated, resulting from an I channel baseband input having a value L;

$Q_{oqH}$=the Q channel receiver output signal, after loopback and with the I channel deactivated, resulting from a Q channel baseband input having a value H;

$Q_{oqL}$=the Q channel receiver output signal, after loopback and with the I channel deactivated, resulting from a Q channel baseband input having a value H;

$T_i$=the I channel transmitter gain; and $T_q$=the Q channel transmitter gain.

29. The circuit according to claim 28, wherein said step of determining determines said (beta) phase error from the equation:

$$(\beta) = tg^{-1}[(X+Y)/2(\cos(\alpha))].$$

30. The method according to claim 22, wherein said step of determining determines said receiver gain mismatch $D_R$ from the following equation:

$$D_R = (I_{oiH} - I_{oiL})/[D_T(Q_{oqH} - Q_{ogL})],$$

wherein $I_{oiH}$=the I channel receiver output signal, after loopback and with the Q channel deactivated, resulting from an I channel baseband input having a value H;

$I_{oiL}$=the I channel receiver output signal, after loopback and with the Q channel deactivated, resulting from an I channel baseband input having a value L;

$Q_{oqH}$=the Q channel receiver output signal, after loopback and with the I channel deactivated, resulting from a Q channel baseband input having a value H;

$Q_{oqL}$=the Q channel receiver output signal, after loopback and with the I channel deactivated, resulting from a Q channel baseband input having a value H; and $$D_T = Ti/Tq,$$

where Ti is the I channel transmitter gain and Tq is the Q channel transmitter gain.

* * * * *